W. H. LARRABEE.
STEP BEARING FOR UPRIGHT SHAFTS.
APPLICATION FILED NOV. 11, 1908.
931,069.
Patented Aug. 17, 1909.
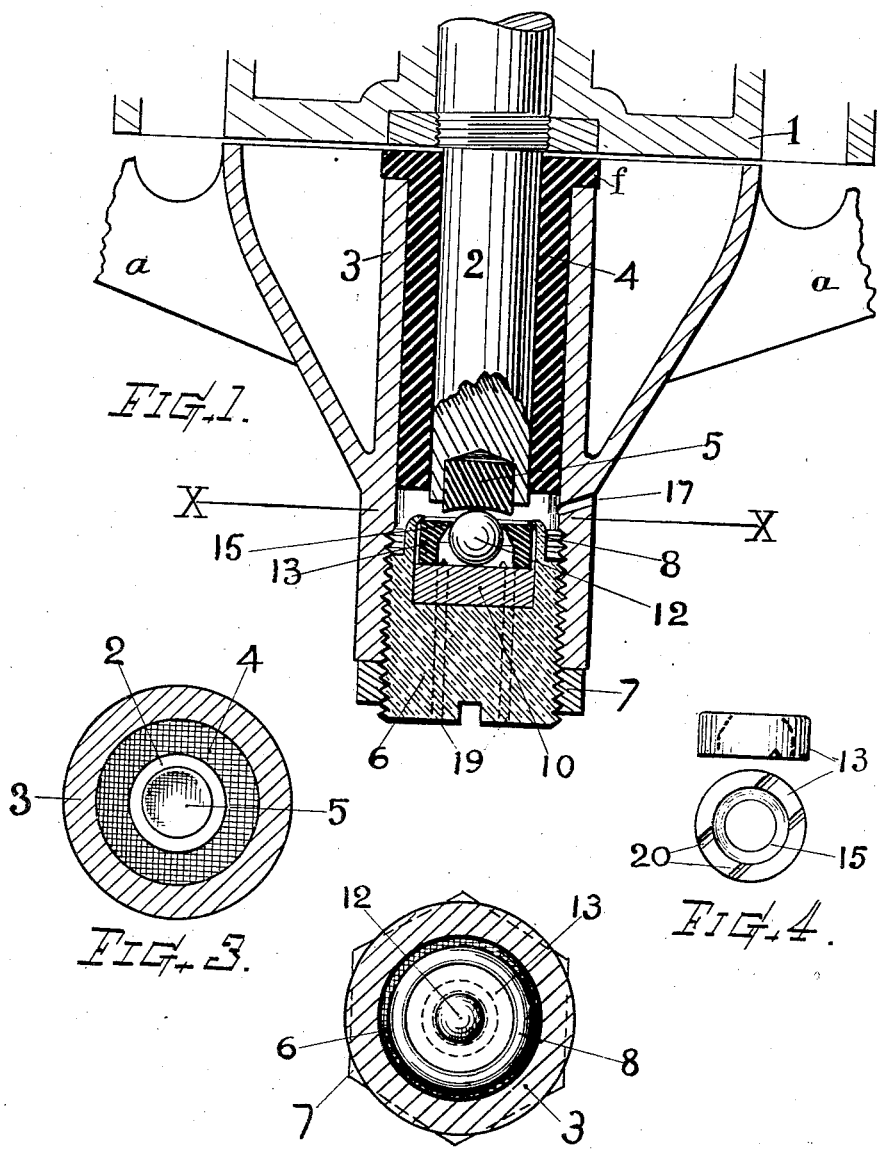

UNITED STATES PATENT OFFICE.

WILLIAM H. LARRABEE, OF WORCESTER, MASSACHUSETTS, ASSIGNOR TO UNION WATER METER COMPANY, OF WORCESTER, MASSACHUSETTS, A CORPORATION OF MASSACHUSETTS.

STEP-BEARING FOR UPRIGHT SHAFTS.

No. 931,069.　　　　Specification of Letters Patent.　　Patented Aug. 17, 1909.

Application filed November 11, 1908. Serial No. 462,923.

*To all whom it may concern:*

Be it known that I, WILLIAM H. LARRABEE, a citizen of the United States, residing at Worcester, in the county of Worcester and State of Massachusetts, have invented a new and useful Step-Bearing for Upright Shafts in Water-Meters and Similar Apparatus, of which the following is a specification, reference being made therein to the accompanying drawings.

The prime object of my present invention is to provide an efficient ball step-bearing for the revolving propellers or meter-wheels, in water meters, and for submerged positions in like apparatus; which step-bearing will operate practically frictionless and with but slight wear or deterioration in use. Also to provide a step-bearing mount for the purpose stated, comprising two hard rubber bearing faces and a non-oxidizable metallic ball, and which can be conveniently manufactured and assembled, and accurately adjusted for use. These objects I attain by the specially designed ball-bearing mechanism illustrated in the accompanying drawing, wherein—

Figure 1 is a vertical sectional view of my invention as applied to the upright shaft of a water meter. Fig. 2 is a horizontal section at line X X on Fig. 1. Fig. 3 is an inverted horizontal section at the same line, and Fig. 4 shows a bottom and side view of the retaining ring employed in the mechanism.

Referring to the drawing, the part indicated by the numeral 1 represents the revolving member or wheel, which in the present instance is shown as a portion of the propeller or meter-wheel of a current water-meter.

2 indicates the shaft, journal or spindle at the lower end of said wheel, which in practice is usually made of bronze metal.

3 indicates the metal bearing-hub, within which there is a tubular bushing 4, preferably made of hard rubber, and having a flange *f* at its upper end to prevent the bushing from settling down within the hub. The shaft is fitted to rotate within the bushing. The bearing-hub 3 can be supported in any suitable manner; as by radial arms *a*, or otherwise, according to the convenience or requirement of the particular situation where employed. In the foot of the shaft I provide a block or facing member 5 of hard rubber or similar suitable non-corrodible material, which is inserted in a cavity formed in the end of the shaft, and preferably projects slightly therefrom at its end. The bottom face of said foot-block 5 is best made slightly concave, as shown; but can in some instances be made flat if so desired. The bearing hub extends some distance below the end of the shaft 2 and has, secured within its lower end, a plug 6 that is preferably screwed into the internally screw-threaded opening in the hub and confined by a jam-nut 7. Or if desired said plug can be otherwise fastened within the hub. This plug is formed with a cylindrical cavity in its upper end and an upright cylindrical rim 8 around said cavity; the plug being of suitable metal, or similar to that of the bearing-hub. Confined within the plug I provide a flat block or seat disk 10, which is made of hard rubber, or equivalent non-corrodible material; and between said hard rubber seat disk and the hard rubber foot-block 5 there is arranged a loose spherical ball 12, which forms the contact support between the stationary and rotating members. Said ball is made of a hard non-oxidizable material, such as a copper-tin alloy, agate, or some hard substance that will not be injuriously affected by the liquid medium about the bearing. Surrounding the ball, and resting upon the flat top surface of the seat-disk, I arrange a loose ring or annulus 13 of hard rubber, or equivalent non-metallic material; said ring being externally of less diameter than the internal diameter of the cavity, and having an internal opening of greater diameter than the ball. The ring is free to move to a limited extent laterally within the circular rim 8, while the ball can have free movement within the ring. The latter is best provided with an inward bevel or lip 15 of less diameter, that extends over the swell of the ball; and while permitting ample looseness, retains the ball approximately in its proper axial relation. The ring 13 is loosely confined within the plug by an inwardly turned lip at the upper edge of the rim 8, so that the loose ball and ring will not be liable to escape from the plug when the latter is removed from the bearing-hub, or while assembling the mechanism.

One or more openings 17 are formed through the side of the hub to admit water or liquid to the bearing-step; and a passage or passages are provided from the top surface of the seat-disk 10 downward through the plug, as indicated by dotted lines 19 on Fig. 1, to allow sediment to pass out of the ball recess. Notches 20 may also be provided in the bottom edge of the annulus to facilitate the exit of sediment.

By turning the screw-threaded plug 6 in or out the step can be adjusted to bring the bearing to the exact required adjustment for the running position of the meter-wheel, and it can be there held by turning up the jam-nut 7 against the end of the bearing-hub.

The concavity in the surface of the foot-block is of much greater radius than the ball; and this concavity tends to keep the ball central with the axis of the shaft. The annulus 13 rests upon the flat top surface of the seat-disk 10 and is free to have a limited lateral movement within the cavity; and, while it does not interfere with the normal action of the ball 12, prevents the ball from getting too far out of central relation with the axial alinement.

By employing a non-oxidizable ball 12 between the hard rubber or non-corrodible bearing surfaces 5 and 10 arranged as set forth, together with the loose hard rubber retaining ring 13, I produce a very efficient, durable and free running step-bearing peculiarly adapted for meter-wheels and the like, where a comparatively frictionless and non-wearable step is required.

I am aware that ball-bearings in different construction have heretofore been employed. Therefore I do not claim broadly the use of a ball for bearing purposes in general.

What I claim and desire to secure by Letters Patent is—

1. In a step-bearing, the combination as described, of the shaft provided with an end piece having a concave face, a cylindrical journal-bearing hub, a plug removably secured in the lower end of said journal-bearing hub, the flat-topped hard-rubber seat-disk inclosed within said plug, the loose hard-rubber guard-ring adjacent to and laterally movable in relation to said seat-disk, and a hard metallic ball loosely arranged within said guard-ring and forming the bearing contact between the concave face at the end of the shaft and the flat top surface of said seat-disk.

2. In a step-bearing for water-meters and the like, the combination as described, of the vertical shaft having a block of hard-rubber securely fixed in its lower end, said block having a concave bearing surface formed upon its lower face, the removable supporting-plug, the lower hard-rubber bearing-block having a flat upper surface fitting into and securely held within said supporting-plug, the non-oxidizable ball, the loose hard-rubber retaining-ring resting and laterally movable upon the flat surface upon which the ball and retaining ring are supported, said supporting-plug provided with one or more passages extending from the upper side of the lower bearing-block down through the plug, and an inlet opening into the bearing above said plug, substantially as and for the purpose set forth.

3. In a step-bearing for water-meters and the like, in combination as described, a hard non-oxidizable ball disposed for free action between the shaft and supporting-step, the shaft and step each provided with a facing member of hard rubber adjacent to the ball, one of said members having a slightly concaved face, an annulus loosely confining said ball approximately central therewith, said annulus being of less diameter than its inclosing chamber and permitted limited lateral movement therein, the supporting-step having an annular wall surrounding the annulus, and means for loosely confining the annulus within the chamber, as set forth.

4. A step-bearing for water-meter-wheel shafts, comprising, in combination, the vertical wheel-shaft, said shaft having at its lower extremity a non-corrodible foot-block with a concave bearing-surface formed on its lower face, the cylindrical journal-bearing, the removable bronze supporting-plug having a cylindrical cavity in its upper end surrounded by an upwardly projecting cylindrical rim, the lower seat-block rigidly held in the cavity of said supporting-plug, the hard non-oxidizable ball resting on said seat-block, the loose retaining ring resting on said seat-block within the cavity, said ring being of less diameter than the interior of the cavity and free to move laterally within its limit, the central hole in the ring at its lower side being of much greater diameter than the diameter of the ball, and said ring provided at its upper side with an inwardly projecting lip that extends over the ball above its equatorial swell, an inwardly-turned lip at the top of the cylindrical rim loosely confining said ring within the cavity, and passages leading from the upper side of the seat-block down through the supporting-plug, for the escape of particles of grit from the bearing surfaces, substantially as set forth.

5. The combination with a vertical meter-wheel-shaft; the journal-bearing-hub therefor having a screw-threaded end, and a bushing within said hub in which the shaft is journaled to rotate; of a supporting-plug threaded into the end of the bearing-hub, said plug having a cylindrical cavity in its upper end, the flat anti-frictional seat-block supported within said cavity, an anti-frictional concave faced foot-block fixed in the end of the shaft, a hard non-oxidizable ball between the seat-block and said concave faced foot-block, and an annulus or ring of anti-frictional material surrounding the ball and loosely disposed within the cavity in the plug above the seat-block, said annulus having at its upper edges an inward beveled lip, the inner edge of which terminates adjacent to and above the swell of the ball.

Witness my hand this 9th day of November, 1908.

WILLIAM H. LARRABEE.

Witnesses:
 CHAS. H. BURLEIGH,
 A. G. DAVIS.